United States Patent
Bewick

(10) Patent No.: US 10,487,749 B2
(45) Date of Patent: Nov. 26, 2019

(54) METHOD FOR DETECTING A FAULT, FAULT DETECTION SYSTEM AND GAS TURBINE ENGINE

(71) Applicant: ROLLS-ROYCE plc, London (GB)

(72) Inventor: Clare Lindsay Bewick, Derby (GB)

(73) Assignee: ROLLS-ROYCE plc, London (GB)

( * ) Notice: Subject to any disclaimer, the term of this patent is extended or adjusted under 35 U.S.C. 154(b) by 744 days.

(21) Appl. No.: 14/976,525

(22) Filed: Dec. 21, 2015

(65) Prior Publication Data
US 2016/0208716 A1  Jul. 21, 2016

(30) Foreign Application Priority Data
Jan. 19, 2015  (GB) .................................. 1500838.6

(51) Int. Cl.
*F02C 9/00* (2006.01)
*G01M 15/14* (2006.01)

(52) U.S. Cl.
CPC ............... *F02C 9/00* (2013.01); *G01M 15/14* (2013.01)

(58) Field of Classification Search
CPC ...... F02C 6/08; F02C 7/22; F02C 9/00; F02C 9/18; F02C 9/24; F02C 9/26; F02C 9/28; F01D 21/14; G01M 3/2815; G01M 3/2876; G01M 15/14; F05D 2260/80; F05D 2270/3015; B64D 13/02–08
See application file for complete search history.

(56) References Cited

U.S. PATENT DOCUMENTS

| | | | |
|---|---|---|---|
| 4,028,888 A * | 6/1977 | Pilarczyk | F02C 7/222 239/550 |
| 5,155,991 A * | 10/1992 | Bruun | B64D 13/04 454/74 |
| 5,261,452 A | 11/1993 | McAndrew et al. | |
| 6,526,358 B1 | 2/2003 | Mathews, Jr. et al. | |
| 6,799,112 B1 | 9/2004 | Carter et al. | |
| 6,990,991 B2 * | 1/2006 | Meckes | A62B 7/14 137/1 |
| 8,033,118 B2 * | 10/2011 | Monteiro | F02C 6/08 60/782 |
| 8,843,253 B1 | 9/2014 | Chapman | |
| 9,546,604 B2 * | 1/2017 | Clauson | F16K 37/0091 |
| 2014/0309846 A1 * | 10/2014 | Howard | B64F 5/0045 701/31.9 |

FOREIGN PATENT DOCUMENTS

| | | | |
|---|---|---|---|
| EP | 0417940 A1 | 3/1991 | |
| EP | 0507725 A1 | 10/1992 | |
| EP | 0511935 A1 | 11/1992 | |
| FR | 2976255 A1 | 12/2012 | |
| GB | 859490 A * | 1/1961 | .......... G01M 3/2815 |
| WO | 2009/094734 A2 | 8/2009 | |

OTHER PUBLICATIONS

Jun. 17, 2016 Search Report issued in European Patent Application No. 15201517.8.
Jul. 14, 2015 Search Report issued in Great Britain Patent Application No. 1500838.6.

* cited by examiner

Primary Examiner — Jason H Duger
(74) Attorney, Agent, or Firm — Oliff PLC

(57) ABSTRACT

A method for detecting a fault in a gas supply system for a gas turbine engine. The method comprises: measuring a pressure difference between two gas supplying ducts of the gas supply system; comparing the measured pressure difference to a threshold level; and determining a fault based on the measured pressure difference and the comparison.

17 Claims, 2 Drawing Sheets

METHOD FOR DETECTING A FAULT, FAULT DETECTION SYSTEM AND GAS TURBINE ENGINE

TECHNICAL FIELD

The present disclosure relates to a method for detecting a fault in a gas supply system for a gas turbine engine. The present disclosure also relates to a fault detection system for detecting a fault in a gas supply system for a gas turbine engine, and to a gas turbine engine comprising the fault detection system.

BACKGROUND

Gas turbine engines (sometimes called aero gas turbines) may include a number of ducts (sometimes called pipes) which carry high pressure air from a compressor to the turbine. The ducts may carry the high pressure air externally to the engine casings. The air may be used to cool the turbine components and/or to control the movement of oil within bearings. Alternatively, ducts may be used to supply air for other purposes such as a cabin air system and bleed valves.

Ducts may contain flow controllers to switch them from high flow to no-flow or a low flow condition. The gas supply system comprising the ducts may be designed to provide enough flow at high power/low altitude conditions (e.g. during take off). This flow is enough to over supply the turbine during cruise conditions. By reducing the flow in cruise conditions, fuel can be saved.

If there is a fault in the gas supply system comprising the ducts, then this can result in a great deal of damage. For example, the nacelle and/or components within the turbine zone may be overheated.

One approach is to detect faults through visual inspection by maintenance personnel. However, it can take many flights to detect faults in this way.

Accordingly, it is desirable to make it easier and quicker to detect faults in the gas supply system for the gas turbine engine.

SUMMARY OF THE DISCLOSURE

According to an aspect, there is provided a method for detecting a fault in a gas supply system for a gas turbine engine, the method comprising: measuring a pressure difference between two gas supplying ducts of the gas supply system; comparing the measured pressure difference to a threshold level; and determining a fault based on the measured pressure difference and the comparison.

If the pressure difference goes above a set level (i.e. the threshold level), then a fault such as a burst gas supplying duct may be indicated. Accordingly, it is possible to detect more easily and quickly whether urgent maintenance action is required. This can help prevent damage being caused to components in the region of the turbine, or to the nacelle itself.

According to the invention, it may be quicker, easier and more reliable to detect a failure in the gas supply system within a single flight. This reduces the possibility of damage to components of the aircraft resulting from bursting of the gas supply system. In particular, urgent maintenance can be carried out at an earlier stage because the fault has been detected at an earlier stage. Detection of failures of the gas supply system can be used to optimise the system. For example, maintenance may be directed to restore the fuel burn benefit of the gas supply system if the failure is in the high flow condition (e.g. if a flow controller of the gas supply system is locked in a high flow condition) or to increase safety by limiting the extent of a failure leading to a reduction in flow.

One of the two gas supplying ducts may be a modulated-type duct provided with a flow controller configured to switch between a high flow condition in which the flow controller does not restrict gas supply through the modulated-type duct and a low flow condition in which the flow controller substantially reduces gas supply through the modulated-type duct. The other of the two gas supplying ducts may be an open-type duct configured to remain open for gas supply through the open-type duct.

When the pressure in the open-type duct is greater than the pressure in the modulated-type duct and the measured pressure difference is greater than the threshold level, it may be determined that the modulated-type duct is burst.

The measuring may be performed when the flow controller is commanded to be in the high flow condition. The method may comprise commanding the flow controller to switch to the low flow condition, re-measuring a pressure difference between the two gas supplying ducts and comparing the re-measured pressure difference to the measured pressure difference.

When the measured pressure difference is less than the threshold level and the re-measured pressure difference is substantially the same as the measured pressure difference, it may be determined that the flow controller is locked in the high flow condition.

When the measured pressure difference is greater than the threshold level and the re-measured pressure difference is greater than the measured pressure difference, it may be determined that the open-type duct is burst.

When the pressure in the modulated-type duct is greater than the pressure in the open-type duct, the measured pressure difference is greater than the threshold level and the re-measured pressure difference is substantially the same as the measured pressure difference, it may be determined that the flow controller is locked in the low flow condition.

The threshold level may differ depending on whether or not the pressure in the open-type duct is greater than the pressure in the modulated-type duct.

Each of the two gas supplying ducts may be an open-type duct configured to remain open for gas supply through the open-type duct. When the measured pressure difference is greater than the threshold level, it may be determined that the open-type duct in which the pressure is lower is burst.

The threshold level may be calculated based on a current engine condition of the gas turbine engine and/or altitude of the gas turbine engine.

According to an aspect, there is provided a fault detection system for detecting a fault in a gas supply system for a gas turbine engine, the fault detection system comprising: a differential pressure sensor for measuring a pressure difference between two gas supplying ducts of the gas supply system; a comparison unit for comparing the measured pressure difference to a threshold level; and a determination unit for determining a fault based on the measured pressure difference and the comparison.

According to an aspect, there is provided a gas turbine engine comprising: the fault detection system mentioned above; and the gas supply system mentioned above. One of the two gas supplying ducts may be a modulated-type duct provided with a flow controller configured to switch between a high flow condition in which the flow controller does not restrict gas supply through the modulated-type duct and a low flow condition in which the flow controller substantially reduces gas supply through the modulated-type duct. The other of the two gas supplying ducts may be an open-type duct configured to remain open for gas supply through the open-type duct.

Each of the two gas supplying ducts may be provided with a venturi at a venturi position for restricting flow through the gas supplying duct. The differential pressure sensor may be arranged to measure the pressure difference between the venturi positions of the two gas supplying ducts.

The gas supply system may comprise a plurality of modulated-type ducts and a corresponding plurality of open-type ducts. The fault detection system may comprise a corresponding plurality of differential pressure sensors, each for measuring a pressure difference between one of the modulated-type ducts and a corresponding one of the open-type ducts. The comparison unit may be for comparing, for each differential pressure sensor, the measured pressure difference to the threshold level. The determination unit may be for determining, for each measured pressure difference and comparison, a fault based on the measured pressure difference and the comparison.

The gas supply system may comprise a plurality of modulated-type ducts. The fault detection system may comprise a corresponding plurality of differential pressure sensors, each for measuring a pressure difference between the open-type duct and one of the modulated-type ducts. The comparison unit may be for comparing, for each differential pressure sensor, the measured pressure difference to the threshold level. The determination unit may be for determining, for each measured pressure difference and comparison, a fault based on the measured pressure difference and the comparison.

According to an aspect, there is provided a method for detecting a fault in a gas supply system for a gas turbine engine, the method being substantially as described herein and/or with reference to the accompanying drawings.

According to an aspect, there is provided a fault detection system for detecting a fault in a gas supply system for a gas turbine engine, the fault detection system being substantially as described herein and/or with reference to the accompanying drawings.

DESCRIPTION OF THE DRAWINGS

Embodiments of the invention will now be described by way of non-limited examples with reference to the accompanying drawings in which.

DETAILED DESCRIPTION

Figure 1:
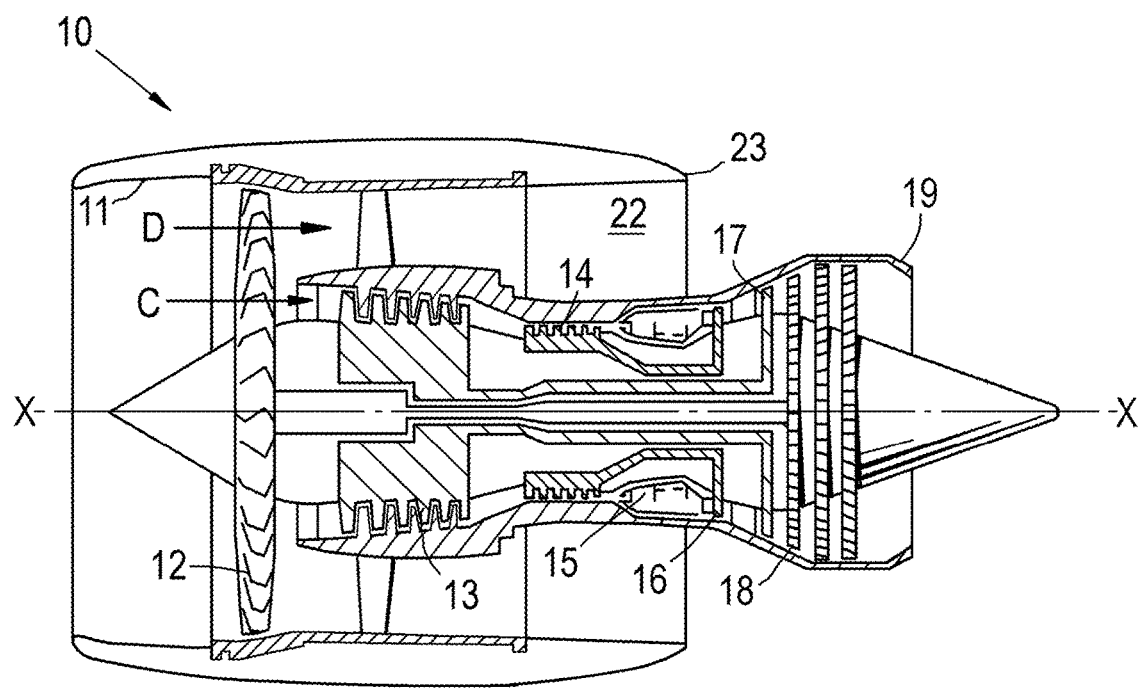
FIG. 1 shows a ducted fan gas turbine engine.

With reference to FIG. 1, a ducted fan gas turbine engine generally indicated at 10 has a principal and rotational axis X-X. The engine 10 comprises, in axial flow series, an air intake 11, a compressive fan 12 (which may also be referred to as a low pressure compressor), an intermediate pressure compressor 13, a high-pressure compressor 14, combustion equipment 15, a high-pressure turbine 16, an intermediate pressure turbine 17, a low-pressure turbine 18 and a core exhaust nozzle 19. The engine also has a bypass duct 22 and a bypass exhaust nozzle 23.

The gas turbine engine 10 works in a conventional manner so that the air entering the intake 11 is accelerated by the fan 12 to produce two air flows; a first air flow C into the intermediate pressure compressor 13 and a second air flow D which passes through the bypass duct 22 to provide propulsive thrust. The intermediate pressure compressor 13 compresses the air flow C directed into it before delivering that air to the high pressure compressor 14 where further compression takes place. The compressed air exhausted from the high-pressure compressor 14 is directed into the combustion equipment 15 where it is mixed with fuel and the mixture combusted. The resulting hot combustion products then expand through, and thereby drive the high, intermediate and low-pressure turbines 16, 17 and 18 before being exhausted through the nozzle 19 to provide additional propulsive thrust. The high, intermediate and low-pressure turbines 16, 17, 18 respectively drive the high and intermediate pressure compressors, 14, 13 and the fan 12 by suitable interconnecting shafts.

Figure 2:
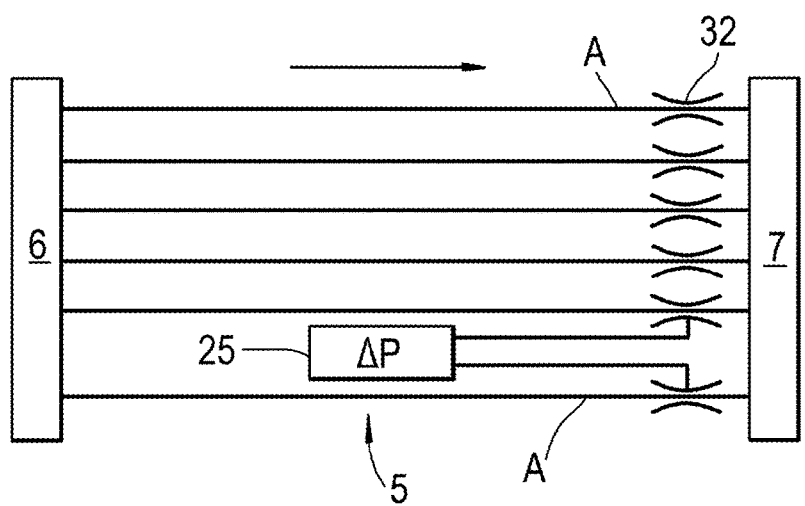
FIGS. 2 to 4 show possible fault detection systems.

FIG. 2 shows a possible fault detection system for detecting a fault in a gas supply system 5 for a gas turbine engine 10. Under normal operation, the gas supplying system 5 supplies gas from a gas supplying component 6 to a gas receiving component 7. The gas supplying component may be a compressor source. For example, the gas supplying component may be one of the compressive fan 12, the intermediate pressure compressor 13 and the high-pressure compressor 14 shown in FIG. 1. Alternatively, the gas supplying component 6 may be an alternative compressor source. The gas receiving component 7 may be an internal manifold of a turbine. For example, the gas receiving component 7 may be one of the high-pressure turbine 16, the intermediate pressure turbine 17 and the low-pressure turbine 18 shown in FIG. 1. Alternatively, the gas receiving component may be an alternative system such as a cabin air supply system or bleed valves.

Blades of the turbines 16, 17, 18 can be cooled by extracting air from the high-pressure compressor 14. Air can be bled from the high-pressure compressor 14, routed around the combustion equipment 15 and put into the turbines 16, 17, 18. Cooling the blades in this way can increase the fuel consumption of the gas turbine engine.

The fault detection system may comprise a differential pressure sensor 25. The differential pressure sensor 25 is for measuring a pressure difference ΔP between two gas supplying ducts A of the gas supply system 5. The differential pressure sensor 25 may determine which gas supplying duct A has the higher pressure. The differential pressure sensor 25 may measure the magnitude of the pressure difference ΔP between the two gas supplying ducts A.

FIG. 2 shows that the gas supplying system 5 may comprise six gas supplying ducts A. However, the number of gas supplying ducts is not particularly limited. For example, the number of gas supplying ducts in the gas supplying system 5 may be two, three, four, five or more than six. In the construction shown in FIG. 2, the differential pressure sensor 25 is for measuring the pressure difference ΔP between the two gas supplying ducts A shown at the bottom of the gas supply system 5 as viewed in FIG. 2.

The type of sensor used for the differential pressure sensor 25 is not particularly limited. The pressure difference ΔP may be measured by the differential pressure sensor in any suitable manner. Merely as an example, pressure tappings may be introduced into the gas supplying ducts A. The pressure may be led to a differential pressure transducer using tubes. Accordingly, the differential pressure sensor 25 may comprise two pressure tappings connected to two corresponding tubes leading to a differential pressure transducer.

A method for detecting a fault in the gas supply system 5 may comprise measuring the pressure difference ΔP between the two gas supplying ducts A of the gas supply system 5.

The pressure difference $\Delta P$ may be measured using the differential pressure sensor 25.

The method for detecting a fault may further comprise comparing the measured pressure difference $\Delta P$ to a threshold level.

Accordingly, by monitoring the pressure difference $\Delta P$ (sometimes called the differential pressure), failures can be detected by looking for unusual values of the pressure difference $\Delta P$. For example, faults that can be detected include one of the gas supplying ducts A being burst. When the gas supplying system is operating normally (i.e. without any faults), only small values for the pressure difference $\Delta P$ may be expected. If the pressure difference $\Delta P$ goes above a set level (i.e. the threshold level), then a fault such as a burst gas supplying duct may be indicated. Accordingly, it is possible to detect more easily and quickly whether urgent maintenance action is required. This can help prevent damage being caused to components in the region of the turbine, or to the nacelle itself.

In the construction shown in FIG. 2, each of the two gas supplying ducts A connected to the differential pressure sensor 25 is an open-type duct A. An open-type duct A is a gas supplying duct A configured to remain open for gas supply through the open-type duct A. The open-type duct A is not switched between a high flow condition and a low flow condition. Instead, the open-type duct A is always in the high flow condition. It may be that in an open-type duct, the gas supply through the open-type duct A cannot be stopped. In other words, an open-type duct A does not contain any open/shut valves or other flow controllers to switch them from high flow to low or no-flow. Instead, an open-type duct A is configured to always supply a high flow of gas.

When there is no break in either of the open-type ducts A, any pressure difference $\Delta P$ measured by the differential pressure sensor 25 is expected to be relatively small. If the pressure difference $\Delta P$ is above the threshold level, then this is an indication that something is wrong, i.e. that one of the open-type ducts A is burst. In the event of a burst duct, flow that has been delivered by the gas supply system 5 can flow backwards through one of the gas supplying ducts A. This can reduce the flow to the gas receiving component 7. When one of the open-type ducts A is burst, the pressure in the burst open-duct A is reduced, such that the pressure is lower in the burst open-type duct A compared to the other duct that is not burst. When the measured pressure difference $\Delta P$ is greater than the threshold level, it may be determined that the open-type duct A in which the pressure is lower is burst.

As depicted in FIG. 2, each of the gas supplying ducts A may be provided with a venturi 32 at a venturi position within the gas supplying duct A. The venturi 32 is for restricting flow through the gas supplying duct A.

In the event of a burst gas supplying duct A, the venturi 32 can limit any backwards flow. Under normal (i.e. no burst gas supplying duct) operation, the venturis 32 may not be choked. However, in the event of a burst gas supplying duct A, the venturis 32 may become choked, thereby limiting the backwards flow. Backwards flow means flow in the opposite direction from the normal direction in which the gas supplying system 5 is used to supply gas. Venturis 32 may be used because they are easy to mount on the gas supplying ducts A.

The differential pressure sensor 25 may be arranged to measure the pressure difference $\Delta P$ between the venturi positions of the two gas supplying ducts A. The pressure difference $\Delta P$ may be measured between tappings in the throats of the venturis of the gas supplying ducts A. Accordingly, the pressure difference $\Delta P$ may be substantially larger than if the venturis 32 were not provided. Nevertheless, the detection system can work without the use of the venturis 32. In particular, the threshold level may be reduced if venturis 32 are not used.

The fault detection system may comprise a comparison unit for comparing the measured pressure difference $\Delta P$ to the threshold level. The fault detection system may further comprise a determination unit for determining a fault based on the measured pressure difference $\Delta P$ and the comparison. Accordingly, fault detection may be automated using the fault detection system.

Alternatively, the method for detecting a fault in the gas supply system 5 may be performed manually. For example, an operator may measure the pressure difference $\Delta P$ between the two gas supplying ducts A using the differential pressure sensor 25. The operator may themselves compare the measured pressure difference $\Delta P$ to a predetermined threshold level, and then determine the fault based on the measured pressure difference $\Delta P$ and the result of the comparison.

Figure 3:
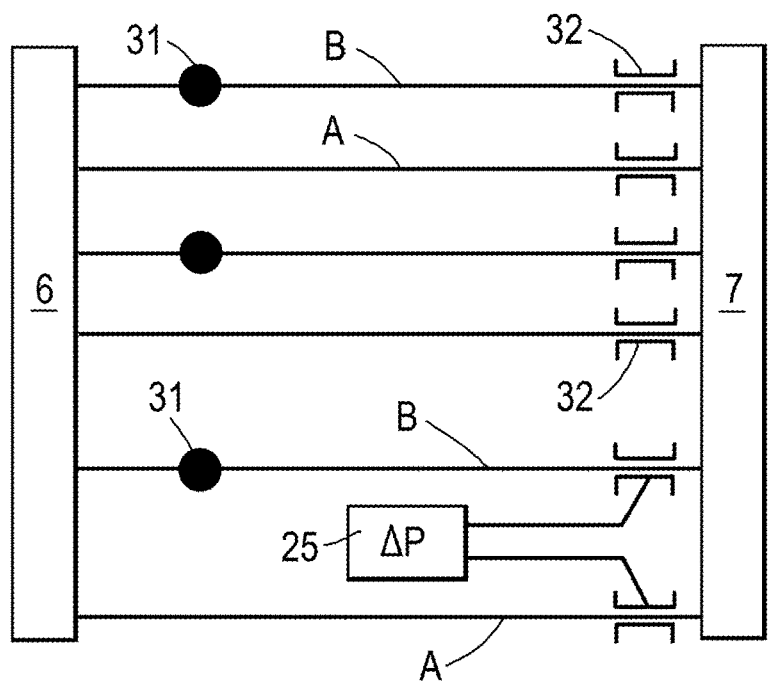

FIG. 3 shows a possible fault detection system. In FIG. 3, the same reference numerals are used in FIG. 2 for corresponding components.

As shown in FIG. 3, one of the two gas supplying ducts A, B to which the differential pressure sensor 25 is connected may be a modulated-type duct B. A modulated-type duct B is a gas supplying duct provided with a flow controller 31. The flow controller 31 is configured to switch between a high flow condition in which the flow controller 31 does not restrict gas supply through the modulated-type duct and a low flow condition in which the flow controller 31 substantially reduces gas supply through the modulated-type duct B. When the flow controller 31 is in the low flow condition, the flow controller may substantially prevent flow through the modulated-type duct B. The low flow condition includes there being no flow through the flow controller 31. Of course, even when the flow controller 31 is in the low flow condition, there may be a small flow through the flow controller 31.

The flow controller 31 may be an open/shut valve. When the flow controller 31 is an open/shut valve, the flow controller 31 may be in the high flow condition when the open/shut valve is in its open position (sometimes called open state). The flow controller 31 may be in the low flow condition when the open/shut valve is in its closed position (sometimes called closed state). The open/shut valve may be compact and easy to mount within the modulated-type duct B.

Alternatively, the flow controller 31 may be a vortex amplifier or a switched vortex valve. A vortex amplifier is sometimes called an air transistor. Within a vortex amplifier, an air signal creates a vortex in the flow which controls how much of the air (e.g. cooling air) goes across the chamber. A vortex amplifier is an amplifier such that it is possible to modulate the flow with no moving parts. The vortex may be set up with a very small injection of air.

As shown in FIG. 3, the other gas supplying duct A connected to the differential pressure sensor 25 is an open-type duct A in which gas supply through the open-duct A is never prevented.

By monitoring the pressure difference $\Delta P$, faults including flow controller failures and burst gas supplying ducts A, B can be detected by looking for unusual pressure differences $\Delta P$. Flow controller failures that can be detected include whether the flow controller 31 is locked in the high flow condition (i.e. has failed in the high flow condition) or whether the flow controller 31 is locked in the low flow condition (i.e. has failed in the low flow condition). It can also be detected whether the open-type duct A or the modulated-type duct B is burst.

When the pressure in the open-type duct A is greater than the pressure in the modulated-type duct B and the measured pressure difference ΔP is greater than the threshold level, it may be determined that the modulated-type duct B is burst. If the pressure in the open-type duct A is ever significantly (i.e. beyond the threshold level) higher than the pressure in the valve-type duct B, there is a break in the valve-type duct B. This is because the only way that the pressure in the modulated-type duct B can be significantly lower than the pressure in the open-type duct A is if the modulated-type duct B is burst. Otherwise, the pressure in the modulated-type duct B should be about the same as the pressure in the open-type duct A when the flow controller 31 is in the high flow condition, or should be higher than the pressure in the open-type duct A when the flow controller 31 is in the low flow condition.

Accordingly, the determination unit of the fault detection system may be configured to determine that the modulated-type duct B is burst when the pressure in the open-type duct A is greater than the pressure in the modulated-type duct B and the measured pressure difference ΔP is greater than the threshold level. When comparing the measured pressure difference ΔP to the threshold level, it may be the magnitude of the measured pressure difference ΔP that is compared to the threshold level.

The method for detecting a fault may comprise performing two measurements of the pressure difference ΔP under two different conditions (i.e. when the flow controller 31 is commanded to be in the high flow condition and when the flow controller 31 is commanded to be in the low flow condition). For example, an initial measurement may be performed when the flow controller 31 is commanded to be in the high flow condition. The flow controller 31 being commanded to be in the high flow condition may mean that the flow controller 31 is specifically commanded to be switched to the high flow condition before the measurement is made. Alternatively, it may be known that the flow controller 31 has already been commanded (i.e. is intended) to be in the high flow condition before the measurement is made.

After the initial measurement of the pressure difference ΔP is made, the flow controller 31 may be commanded to switch to the low flow condition. The pressure difference ΔP may be re-measured with the flow controller 31 commanded to be in the low flow condition. The results of the two measurements of the pressure difference ΔP may be compared. In other words, the re-measured pressure difference Δ(commanded to low flow condition) may be compared to the measured pressure difference ΔP (commanded to high flow condition).

When the measured pressure difference ΔP (commanded to high flow condition) is less than the threshold level and the re-measured pressure difference (commanded to low flow condition) is substantially the same as the measured pressure difference ΔP (flow controller commanded to high flow condition), it may be determined that the flow controller 31 is locked in the high flow condition. It is possible to detect that the flow controller 31 is failed in the high flow condition if the pressure difference ΔP stays approximately zero when the flow controller 31 is commanded to the low flow condition. The only time when the pressure difference ΔP should be approximately zero (and hence below the threshold level) is when there are no breaks in the gas supplying ducts A, B and the flow controller 31 is in the high flow condition.

Otherwise, when the flow controller 31 is in the low flow condition, the pressure in the modulated-type duct B should be higher than the pressure in the open-type duct A. The magnitude of the pressure difference ΔP should be medium, which means more than when the flow controller 31 is in the high flow condition but less than when there is a break in one of the gas supplying ducts A, B. Hence, if the pressure difference ΔP remains substantially the same (i.e. below the threshold level) even when the flow controller 31 is commanded to switch to the low flow condition, this is an indication that the flow controller 31 is locked in the high flow condition.

The fault detection system may be arranged to automatically command the flow controller 31 to switch to the low flow condition, re-measure the pressure difference ΔP between the two gas supplying ducts A, B and compare the re-measured pressure difference ΔP to the initially measured pressure difference ΔP. The determination unit may be configured to determine that the flow controller 31 is locked in the high flow condition when the measured pressure difference ΔP is less than the threshold level and the re-measured pressure difference ΔP is substantially the same as the measured pressure difference ΔP.

When the measured pressure difference ΔP is greater than the threshold level and the re-measured pressure difference ΔP is greater than the measured pressure difference ΔP, it may be determined that the open-type duct A is burst. In particular, if with the flow controller 31 in the high flow condition the pressure difference ΔP is above the threshold level, then this is an indication that something is wrong. If the pressure difference ΔP then increases when the flow controller 31 is commanded shut, this is an indication that the open-type duct A is broken (i.e. burst).

The determination unit may be configured to determine that the open-type duct A is burst when the measured pressure difference ΔP is greater than the threshold level and the re-measured pressure difference is greater than the measured pressure difference ΔP.

When the pressure in the modulated-type duct B is greater than the pressure in the open-duct, the measured pressure difference ΔP is greater than the threshold level and the re-measured pressure difference ΔP is substantially the same as the measured pressure difference ΔP, it may be determined that the flow controller 31 is locked in the low flow condition. If with the flow controller 31 in the high flow condition, the pressure difference ΔP is above the threshold level, this is an indication that something is wrong. If the pressure difference ΔP does not change when the flow controller 31 is commanded to the low flow condition, then this indicates that the flow controller 31 has failed in the low flow condition.

The determination unit may be configured to determine that the flow controller 31 is locked in the low flow condition when the pressure in the modulated-type duct B is greater than the pressure in the open-type duct A, the measured pressure difference ΔP is greater than the threshold level and the re-measured pressure difference ΔP is substantially the same as the measured pressure difference ΔP.

Accordingly, it is possible to give reliable failure detection for the gas supplying ducts A, B connected to the differential pressure sensor 25, using only the differential pressure sensor 25.

Generally, it may be possible to differentiate between a burst gas supplying duct A, B and a failed flow controller 31 because a burst gas supplying duct A, B may produce higher pressure differences due to the throat of the venturi 32 being choked for a burst gas supplying duct A, B but not for a flow controller failure. However, if a partial burst occurs in the gas supplying duct A, B in which the flow rate is low, then it may not be possible to differentiate between a burst duct and a failed flow controller. By measuring the pressure difference ΔP when the flow controller 31 is commanded to be in the high flow condition and then subsequently re-measuring the pressure difference ΔP after commanding the flow controller 31 to switch to the low flow condition, it is possible to differentiate between a burst duct and a failed flow controller.

The possibility of there being both a flow controller failure and a burst in one of the gas supplying ducts A, B is extremely unlikely.

When performing the measurement and subsequent re-measurement, it is not necessary for the initial measurement to be performed with the flow controller 31 commanded to the high flow condition and the subsequent re-measurement to be performed with the flow controller 31 commanded to the low flow condition. Instead, the initial measurement may be performed with the flow controller 31 commanded to be in the low flow condition, and the subsequent re-measurement may be performed after the flow controller 31 has been commanded to switch to the high flow condition. In this case, when the pressure in the open-type duct A is greater than the pressure in the modulated-type duct B and the (initially) measured pressure difference ΔP is greater than the threshold level, it may be determined that the modulated-type duct B is burst.

When the initially measured (with flow controller 31 commanded to the low flow condition) pressure difference ΔP is less than the threshold level and the re-measured (flow controller 31 commanded to the high flow condition) pressure difference ΔP is substantially the same as the initially measured pressure difference ΔP, it may be determined that the flow controller 31 is locked in the high flow condition.

When the initially measured (flow controller 31 commanded to the low flow condition) pressure difference is greater than the threshold level and the re-measured (flow controller 31 commanded to the high flow condition) pressure difference ΔP is less than the initially measured (flow controller 31 commanded to the low flow condition) pressure difference ΔP, it may be determined that the open-type duct A is burst.

When the pressure in the modulated-type duct B is greater than the pressure in the open-type duct A, the initially measured (flow controller 31 commanded to the low flow condition) pressure difference ΔP is greater than the threshold level and the re-measured (flow controller 31 commanded to the high flow condition) pressure difference ΔP is substantially the same as the initially measured (flow controller 31 commanded to low flow condition) pressure difference ΔP, it may be determined that the flow controller 31 is locked (i.e. has failed) in low flow condition.

Figure 4:
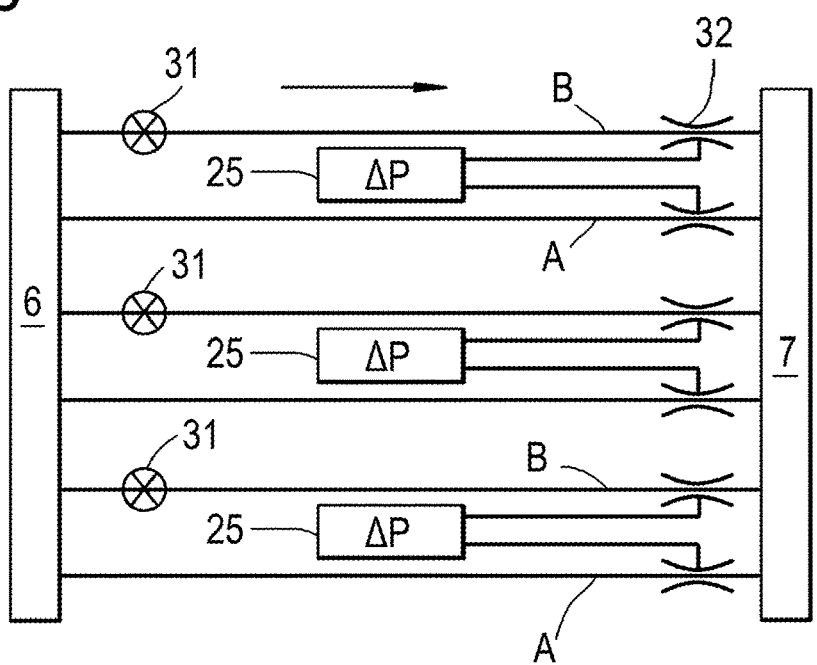

FIG. 4 shows a possible fault detection system. In FIGS. 2 and 4, the arrow at the top of the Figure extending from left to right shows the direction of gas flow when there is no fault in the gas supply system 5 supplying gas from the gas supplying component 6 to the gas receiving component 7.

As shown in FIG. 4, the gas supply system 5 may comprise a plurality of modulated-type ducts B and a corresponding plurality of open-type ducts A. Each modulated-type duct B may be paired up with a corresponding open-type duct A.

The fault detection system may comprise a corresponding plurality of differential pressure sensors 25. Each differential pressure sensor 25 may be for measuring a pressure difference ΔP between one of the modulated-type ducts B and a corresponding one of the open-type ducts A.

The comparison unit may be for comparing, for each differential pressure sensor 25, the measured pressure difference ΔP to the threshold level. The determination unit may be for determining, for each measured pressure difference ΔP and comparison, a fault based on the measured pressure difference ΔP and the comparison.

As shown in FIG. 4, there may be six gas supplying ducts A, B carrying gas (e.g. air). Three of the gas supplying ducts may be modulated-type ducts B containing flow controllers 31 to switch them from high flow to low flow. Accordingly, the gas supply system 5 may be designed to provide enough flow at high power/low altitude condition (e.g. during take off) and enough flow to over supply the gas receiving component 7 (e.g. turbine) during cruise conditions. By reducing the flow in cruise conditions, a significant fuel saving benefit can be made. There is a fuel saving benefit when the air flow (e.g. used to cool the blades of the turbines 16, 17, 18) is modulated by turning it down when not so much is needed.

In the event of a flow controller 31 failing in the low flow condition, it may be possible to lock the flow controller 31 in the high flow condition to allow the aircraft to be dispatched with sufficient flow to the turbine to prevent accumulated damage. Meanwhile, in the event of a burst gas supplying duct 5, flow that has been delivered to the turbine can flow backwards through one of the ducts thus reducing the flow to the turbine. Venturis 32 may be provided to limit this flow. The venturis 32 may not be provided to all of the gas supplying ducts 5. For example, it may be that only the open-type ducts A contain venturis 32.

An embodiment of the invention is expected to ensure that no single control failure can lead to a hazardous condition. In the construction shown in FIG. 4, it may be possible to give full failure detection for all the ducts with only three transducers (in the three differential pressure sensors 25).

It is not necessary for the gas supplying ducts A, B to be provided in pairs connected by a common differential pressure sensor 25. Instead, it is possible to link one duct to two ducts. For example, this may be desirable if there are unequal numbers of open-type ducts A and modulated-type ducts B.

The gas supply system 5 may be arranged such that all of the modulated-type ducts B contain a venturi 32. It may be that only one of the open-type ducts A has a venturi 32. In this case, all of the modulated-type ducts B may be linked to the open-type duct A that has the venturi 32 via corresponding differential pressure sensors 25. In such a construction it may not be possible to detect whether one of the open-type ducts A that does not contain any venturi 32 is burst. However, by reducing the number of venturis 32 in the gas supply system 5, cost and weight of the gas supply system may be reduced.

It may be possible to detect an increased back-flow through a burst open-type duct A that does not contain any venturi 32. In this way, it may be possible to detect that the open-type duct A without any venturi 32 has a burst. This may be detectable via increased pressure differences ΔP in the modulated-type ducts B containing venturis 32.

The threshold level may differ depending on whether or not the pressure in the open-type duct A is greater than the pressure in the modulated-type duct B. The threshold level may be calculated based on a current engine condition of the gas turbine engine 10 and/or altitude of the gas turbine engine 10.

It is not necessary for the pressure tappings to actually be at the throat position within the venturis 32. However, this is the position which will see the highest pressure difference ΔP. Hence, the throat position within the venturi 32 may be considered to be the "sweet spot" in terms of maximising the sensitivity of detection.

According to the invention, it may not necessary to measure the pressure individually in each of the gas supplying ducts A, B of the gas supplying system 5. Hence, the fault detection system may be cheaper, lighter and more reliable.

It is possible to detect a fault between two modulated-type ducts B. When the pressure difference ΔP is greater than the threshold value, this is an indication that one of the modulated-type ducts B is burst. Otherwise, under normal working conditions, it would be expected that the pressure difference ΔP would be low, lower than the threshold level. However, if there were flow controller failures in the flow controller 31 of both modulated-type ducts B (e.g. due to a common fault in the flow controller actuation system), then it may not be possible to detect the failure.

The actuation system for the flow controllers may be designed so that such a common failure is sufficiently unlikely. A pair of gas supplying ducts A, B may be provided with two differential pressure sensors 25. This accommodates the possibility that one of the differential pressure sensors 25 fails during a flight. Introducing redundancy into the system improves its reliability.

According to the invention, it may be quicker, easier and more reliable to detect a failure in the gas supply system 5 within a single flight. This reduces the possibility of damage to components of the aircraft resulting from failure of the gas supply system 5. In particular, urgent maintenance can be carried out at an earlier stage because the fault has been detected at an earlier stage.

Whilst aspects of the disclosure relate to providing a gas supply system 5 for supplying gas from a compressor source to a turbine in a gas turbine engine, it will be appreciated that the gas supply system could supply gas from and to different components. Where the disclosure relates to the exemplary arrangements/methods described above, many equivalent modifications and variations will be apparent to those skilled in the art when given this disclosure. Accordingly, the exemplary arrangements/methods set fourth above are considered to be illustrative and not limiting. Various changes to the described arrangements/methods may be made without departing from the scope of the invention.

Where reference is made herein to a gas supply system, it will be appreciated that this term may be any type of gas supply system, including, but not limited to, a turbine cooling system, a bearing oil control system and a cabin air system. Aspects of the disclosure may be applicable, for example, to any gas supply system comprising ducts. Any feature described and/or claimed herein may be combined with any other compatible feature described in relation to the same or another embodiment.

The invention claimed is:

1. A method for detecting a fault in a gas supply system of a gas turbine engine, the method comprising:
supplying a flow of gas through two gas supplying ducts each extending from a compressor of the gas turbine engine to a turbine of the gas turbine engine,
measuring a pressure difference between the two gas supplying ducts, each of the two gas supplying ducts being provided with a venturi at a venturi position for restricting the flow of gas through the gas supplying ducts, wherein a first one of the two gas supplying ducts is an open-type duct configured to always remain open and not containing any valves or flow controllers capable of modulating the flow of gas through the first one of the two gas supplying ducts, and a differential pressure sensor is arranged to perform the measuring of the pressure difference between the venturi positions of the two gas supplying ducts;
performing a first comparison of the measured pressure difference to a threshold level; and
determining the fault in the gas turbine engine gas supply system based on the measured pressure difference and the first comparison, wherein the fault is a burst condition of the first one of the two gas supplying ducts, a burst condition of a second one of the two gas supplying ducts, or an unusual flow condition of the second one of the two gas supplying ducts.

2. The method of claim 1, wherein:
the second one of the two gas supplying ducts is a modulated-type duct provided with a flow controller configured to switch between a high flow condition in which the flow controller does not restrict the flow of gas through the second one of the two gas supplying ducts and a low flow condition in which the flow controller substantially reduces the flow of gas through the second one of the two gas supplying ducts.

3. The method of claim 2, wherein the fault is determined to be the burst condition of the second one of the two gas supplying ducts in response to a pressure in the first one of the two gas supplying ducts being greater than a pressure in the second one of the two gas supplying ducts and the first comparison indicating the measured pressure difference is greater than the threshold level.

4. The method of claim 2, wherein:
the measuring of the pressure difference is performed when the flow controller is in the high flow condition; and
the method further comprises
commanding the flow controller to switch to the low flow condition,
re-measuring the pressure difference between the two gas supplying ducts, and
performing a second comparison comparing the re-measured pressure difference to the measured pressure difference.

5. The method of claim 4, wherein the fault is determined to be the unusual flow condition of the second one of the two gas supplying ducts and the unusual flow condition is determined to be that the flow controller is locked in the high flow condition in response to the first comparison indicating the measured pressure difference is less than the threshold level and the second comparison indicating the re-measured pressure difference is equal to the measured pressure difference.

6. The method of claim 4, wherein the fault is determined to be the burst condition of the first one of the two gas supplying ducts in response to the first comparison indicating the measured pressure difference is greater than the threshold level and the second comparison indicating the re-measured pressure difference is greater than the measured pressure difference.

7. The method of claim 4, wherein the fault is determined to be the unusual flow condition of the second one of the two gas supplying ducts and the unusual flow condition is determined to be that the flow controller is locked in the low flow condition in response to a pressure in the second one of the two gas supplying ducts being greater than a pressure in the first one of the two gas supplying ducts, the first comparison indicating the measured pressure difference is greater than the threshold level and the second comparison indicating the re-measured pressure difference is equal to the measured pressure difference.

8. The method of claim 1, wherein the threshold level varies depending on whether the first one or the second one of the two gas supplying ducts is of a greater pressure.

9. The method of claim 1, wherein:
the fault is the burst condition of the first one of the two gas supplying ducts or the burst condition of the second one of the two gas supplying ducts;
the second one of the two gas supplying ducts is an open-type duct configured to always remain open and not containing any valves or flow controllers capable of modulating the flow of gas through the second one of the two gas supplying ducts; and
the fault is determined to be
the burst condition of the first one of the two gas supplying ducts in response to the first comparison indicating the measured pressure difference is greater than the threshold level and a pressure in the second one of the two gas supplying ducts being greater than a pressure in the first one of the two gas supplying ducts, or
the burst condition of the second one of the two gas supplying ducts in response to the first comparison indicating the measured pressure difference is greater than the threshold level and the pressure in the first one of the two gas supplying ducts being greater than the pressure in the second one of the two gas supplying ducts.

10. The method of claim 1, wherein the threshold level is calculated based on a current engine condition of the gas turbine engine and/or an altitude of the gas turbine engine.

11. The method of claim 1, wherein:
the fault is the burst condition of the first one of the two gas supplying ducts or the burst condition of the second one of the two gas supplying ducts; and
the second one of the two gas supplying ducts an open-type duct configured to always remain open and not containing any valves or flow controllers capable of modulating the flow of gas through the second one of the two gas supplying ducts.

12. The method of claim 1, wherein:
the second one of the two gas supplying ducts is a modulated-type duct provided with an open/shut valve.

13. The method of claim 1, wherein: the compressor is one of: a compressive fan, an intermediate pressure compressor, and a high pressure compressor.

14. The method of claim 1, wherein: the turbine is one of: a low pressure turbine, an intermediate pressure turbine, and a high pressure turbine.

15. The method of claim 1, wherein:
the compressor is one of: a compressive fan, an intermediate pressure compressor, and a high pressure compressor; and
the turbine is one of: a low pressure turbine, an intermediate pressure turbine, and a high pressure turbine.

16. The method of claim 1, further comprising:
supplying an additional flow of gas through at least one additional gas supplying duct extending from the compressor to the turbine.

17. The method of claim 16, wherein: the compressor is one of: a compressive fan, an intermediate pressure compressor, and a high pressure compressor.

* * * * *